(12) United States Patent
Saliaris

(10) Patent No.: US 6,979,137 B1
(45) Date of Patent: Dec. 27, 2005

(54) WEATHER SHIELD FOR CAMERA

(76) Inventor: Daniel P. Saliaris, 4783 Canterbury Ct., Delaware, OH (US) 43015

( * ) Notice: Subject to any disclaimer, the term of this patent is extended or adjusted under 35 U.S.C. 154(b) by 0 days.

(21) Appl. No.: 11/032,974

(22) Filed: Jan. 11, 2005

(51) Int. Cl.[7] ............................................. G03B 17/00
(52) U.S. Cl. .................................................. 396/422
(58) Field of Search ............................... 396/419, 420, 396/422

(56) References Cited

U.S. PATENT DOCUMENTS

| | | | |
|---|---|---|---|
| 3,731,897 A * | 5/1973 | Price ........................ | 248/230.1 |
| 4,176,701 A | 12/1979 | Welgan | |
| 4,187,021 A * | 2/1980 | Balser ........................ | 396/422 |
| 5,092,458 A | 3/1992 | Yokoyama | |
| 5,456,277 A | 10/1995 | Pontius, Jr. | |
| D370,336 S * | 6/1996 | Rosier ........................ | D3/5 |
| 5,625,854 A | 4/1997 | White | |
| 2003/0201005 A1 * | 10/2003 | Hilmersen ................... | 135/16 |
| 2004/0070241 A1 * | 4/2004 | Ventimiglia et al. ...... | 297/217.1 |

* cited by examiner

*Primary Examiner*—Christopher Mahoney
(74) *Attorney, Agent, or Firm*—Jason H. Foster; Kremblas, Foster, Phillips & Pollick

(57) ABSTRACT

The invention is an apparatus for shielding a camera having an arm that is removably mounted to a body of the camera and a hand-grippable handle of an umbrella is removably mounted to the arm. The umbrella handle is preferably removably mounted in a housing attached to a finger at the end of the arm. The shield covers both the camera and the user of the camera.

5 Claims, 2 Drawing Sheets

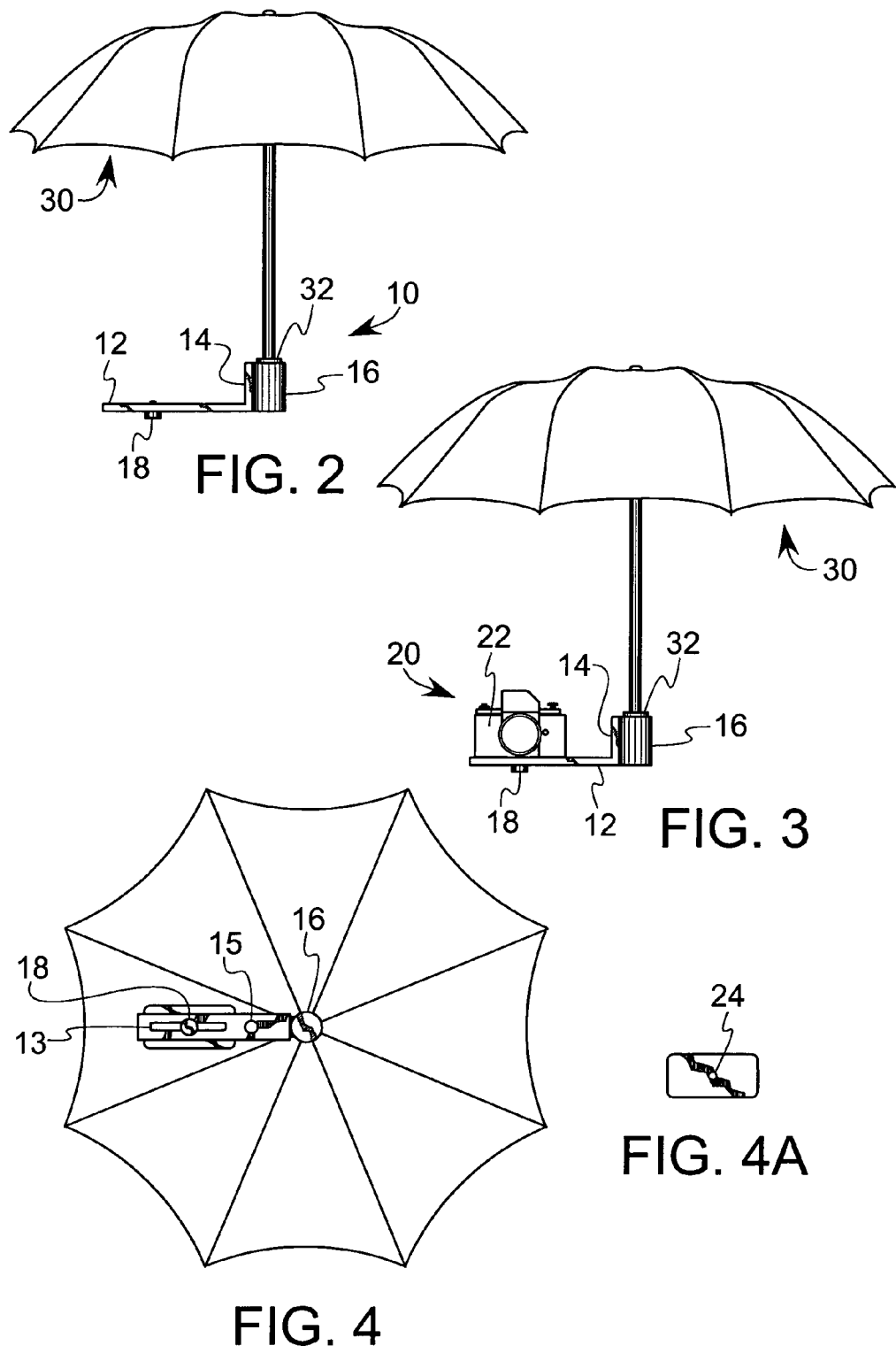

WEATHER SHIELD FOR CAMERA

BACKGROUND OF THE INVENTION

1. Field of the Invention

This invention relates generally to camera accessories, and more specifically to a protective covering for cameras.

2. Description of the Related Art

Generally, when a person is using a camera outdoors the weather is a concern. For example, the sun, rain, snow or other types of weather are not only unpredictable, but can change quickly throughout a day. There are currently very few ways to protect the user and camera from the changing weather.

One conventional approach is to place a plastic enclosure around both the camera and the user's head, as disclosed in U.S. Pat. No. 5,456,277 to Pontius, Jr. The enclosure protects the camera and the user's head, but does not protect the rest of the user from inclement weather. Furthermore, the idea of a user placing his or her head inside a plastic bag-like enclosure in order to take photographs or video is unsafe, especially if the user is a child. During inclement weather the wind can be quite forceful and could present suffocation problems for the user who has placed his or her head inside the enclosure.

Additional devices for protecting a camera include a plastic covering or housing, as disclosed in U.S. Pat. No. 5,625,854 to White; U.S. Pat. No. 4,176,701 to Welgan; and U.S. Pat. No. 5,092,458 to Yokoyama. The problem with these devices is that although the camera is protected, the user is not.

Therefore, it is an object and feature of the invention to provide a safe method and apparatus to shield the user and camera from the elements of nature.

BRIEF SUMMARY OF THE INVENTION

The invention is an apparatus for shielding a camera and a user from the weather. The apparatus has an arm that is removably mounted to a body of the camera and a hand-grippable handle of an umbrella that is removably mounted to the arm. The apparatus covers both the camera and at least part of the user of the camera.

The method for using the apparatus includes removably mounting the arm to the body of the camera and removably mounting the hand-grippable handle of the umbrella to the arm. The user then opens the umbrella so that an outer extremity of the umbrella extends beyond the edges of the camera, protecting the user and the camera from the weather.

BRIEF DESCRIPTION OF THE SEVERAL VIEWS OF THE DRAWINGS

FIG. 2 is a view in perspective illustrating the preferred embodiment of the present invention.

FIG. 3 is a side view illustrating the embodiment of FIG. 2.

FIG. 4 is a bottom view illustrating the embodiment of FIG. 3.

FIG. 4A is a bottom view illustrating the camera of the preferred embodiment.

Figure 1:
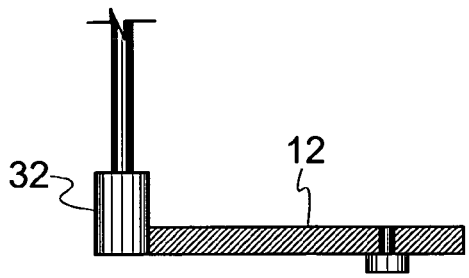
FIG. 1 is a side view illustrating an embodiment of the present invention.

In describing the preferred embodiment of the invention, which is illustrated in the drawings, specific terminology will be resorted to for the sake of clarity. However, it is not intended that the invention be limited to the specific term so selected and it is to be understood that each specific term includes all technical equivalents, which operate in a similar manner to accomplish a similar purpose. For example, the word connected or term similar thereto is often used. They are not limited to direct connection, but include connection through other elements where such connection is recognized as being equivalent by those skilled in the art.

DETAILED DESCRIPTION OF THE INVENTION

The preferred apparatus 10 has an arm 12 that can be removably mounted to the body 22 of the camera 20, as shown in FIGS. 1–3. The term "camera" includes video, motion picture, or still photography equipment. The apparatus 10 can also be used with telescopes, binoculars or any variety of devices that have an opening on them that is designed for mounting to a tripod, or that can be adapted to have such an opening.

A hand-grippable handle 32 of an umbrella 30 is removably mounted to the arm 12. There are a variety of ways to mount the handle 32 to the arm 12. For example, wire ties, hose clamps, c-clamps, or other securing devices can be used. Because the handle of the umbrella can be mounted in any of these ways, virtually any type of umbrella handle can be used with the apparatus. For example, umbrella handles that have a J-shape or are in the shape of an animal or cartoon character can be used with the apparatus, and it will become apparent to a person of ordinary skill how to attach such umbrellas to the invention.

The preferred structure for attaching the umbrella 30 to the arm 12 is illustrated in FIGS. 2 and 3. The arm 12 includes a finger 14 that extends at an angle, preferably 90°, from the rest of the arm 12, and is removably mounted to the housing 16. The housing 16 is a circular cylindrical structure with a sidewall having a central passage for receiving the cylindrical, hand-grippable handle 32 of the umbrella 30. The housing 16 can have a variety of shapes in order to accommodate a variety of handle shapes and sizes.

Figure 5:
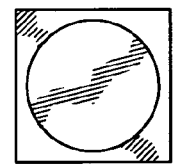
FIG. 5 is a top view illustrating an alternative embodiment of the present invention.

Alternatively, the housing can have interchangeable liners, as illustrated in FIG. 5, to accommodate the different sizes of umbrella handles. For example, the central passage of the housing can have a large square opening but a smaller compressible liner with a circular cylindrical passage, can be inserted to accommodate a smaller circular shaped handle of an umbrella. Likewise, a plurality of such liners can be used to accommodate most umbrella handles.

The finger 14 is preferably rigidly mounted to the end of the straight region of the arm 12, but as will be recognized by a person of ordinary skill, the finger can be mounted in a variety of ways. The finger 14 is preferably formed integrally with the arm 12, such as by forming the arm 12 from a strip of aluminum, and bending it 90° to form the finger 14, or it can be welded to the arm 12, pivotably mounted or removably mounted to the arm 12, as described below. The arm 12 is preferably made of aluminum, but a variety of metals, plastics and composites can be used to make the arm 12.

The arm 12 has an opening 13 with a slidably adjustable mounting screw 18 for mounting the arm 12 to a threaded aperture 24 in the body 22 of the camera 20. The aperture 24 in the body of the camera 22 is conventionally known as the tripod-mounting hole, which is available in most cameras and is illustrated in FIGS. 4 and 4A. This is the hole with which any camera can be mounted to a tripod, monopod, or any other accessory merely by tightening a screw in the hole. The screw 18 is inserted into the aperture 24, the arm 12 is positioned longitudinally relative to the camera, and the screw 18 is tightened to lock the arm 12 in position on the camera.

In addition to the opening 13, the preferred embodiment has a threaded aperture 15 adjacent to the opening 13 for mounting the arm 12 to a conventional tripod (not shown). The threaded aperture 15 preferably has a threaded circular passage, but can have any variety of structures to accommodate the mounting means of the tripod. The aperture 15 permits the camera to be attached to the arm 12 in addition to a tripod.

Figure 6A:
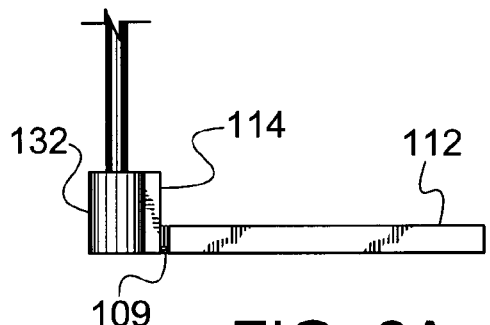
FIG. 6A is a side view illustrating an alternative embodiment of the present invention.
Figure 6B:
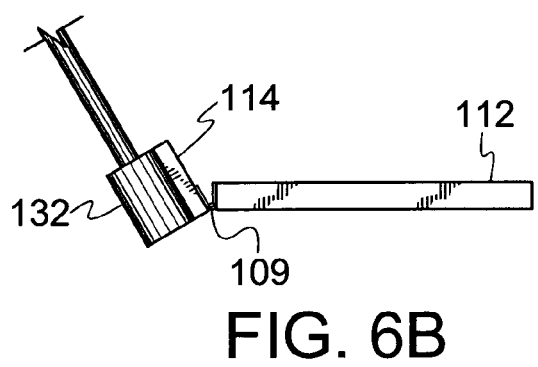
FIG. 6B is a side view illustrating an alternative embodiment of the present invention.

In a first alternative embodiment illustrated in FIGS. 6A and 6B, the finger 114 is pivotably mounted to the rest of the arm 112. For example, a hinge 109 is mounted between the finger 114 and the remainder of the arm 112. Depending upon the orientation of the hinge 109, the finger 114 can move either up and down in a vertical plane, side to side in a horizontal plane, or diagonally in a diagonal plane relative to the arm 112. These movements enable the user to manipulate the finger 114 and the umbrella relative to the rest of the arm 112 and the camera. Precipitation can fall in at a variety of angles, and with the pivotably mounted finger the user can move the umbrella 120 relative to the camera as the weather changes or the sun moves throughout the day. In addition, the pivotable attachment allows the user to rotate the camera 90° from a "portrait" to a "landscape" orientation while keeping the umbrella above the camera and user.

Figure 7:
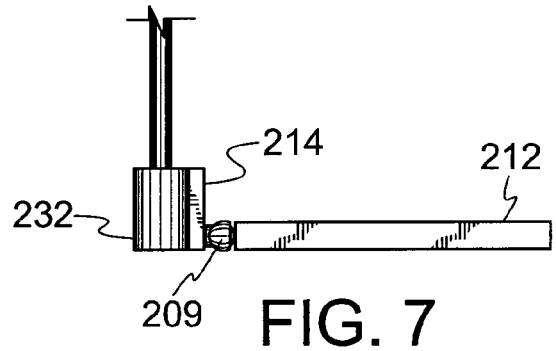
FIG. 7 is a side view illustrating an alternative embodiment of the present invention.

Another alternative, illustrated in FIG. 7 is to mount the finger 214 to the arm 212 using a ball and socket 209 joint. This allows the user to rotate the umbrella in an infinite number of angles and directions, not limiting the movement to within a particular plane.

Figure 8:
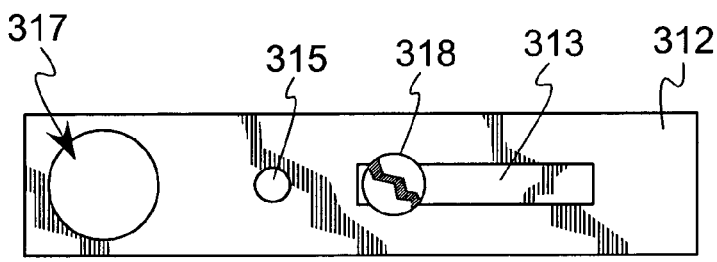
FIG. 8 is a top view illustrating an alternative embodiment of the present invention.

In yet another alternative embodiment illustrated in FIG. 8, the arm 312 has three openings, the slot 313 with the mounting screw 318, the tripod mount opening 315 and a third opening 317 for inserting the handle of the umbrella (not shown). This permits mounting of an umbrella that cannot be feasibly mounted using the above-described structures. Other fasteners can be used in combination with this arm 312.

The preferred method for using the apparatus begins with the user removably mounting the arm 12 to the camera 20. The slidably adjustable mounting screw 18 is moved in the slot by the user to line up with the opening 24 in the body 22 of the camera and the mounting screw 18 is inserted into the opening 24. The screw 18 is tightened, which locks the arm 12 to the body of the camera 20. Either before or after the arm 12 is in place, the user opens the umbrella 30. According to the type of umbrella being used, this can be done either manually or mechanically. It is possible, depending upon the umbrella, to open the umbrella after mounting it to the arm 12. The user inserts the handle 32 of the umbrella 30 into the housing 16, which is mounted to the finger 14. After assembly, the user can use the camera in a variety of weather situations. Furthermore, if the user decides to use a tripod, the arm 12 is mounted to the tripod by inserting and tightening the tripod screw into the threaded aperture 15 that is adjacent the opening 13 of the arm 12.

In an alternative method in which there is no housing 16, the user adjusts the mounting screw 18 to line up with the opening 24 in the body 22 of the camera and inserts the mounting screw 18 into the opening 24. The user then tightens the mounting screw 18, which locks the arm 12 to the body of the camera 20. The user proceeds by opening the umbrella 30 and mounting the handle 32 of the umbrella 30 to the arm 12, preferably the finger 14 region of the arm 12, using wire ties or any other conventional fastener (not shown). The fasteners can be placed around the handle 32 in a variety of locations to make the apparatus more sturdy.

When in operation, the outer extremities of the umbrella extend beyond the edges of the camera and most, if not all, of the user's body, as illustrated in FIGS. 3 and 4. This is advantageous because it protects both the camera and the user from the weather. The umbrella provides an expansive area under which the user can stand and still remain protected.

While certain preferred embodiments of the present invention have been disclosed in detail, it is to be understood that various modifications may be adopted without departing from the spirit of the invention or scope of the following claims.

What is claimed is:

1. An apparatus shielding a camera the apparatus comprising:
    (a) an arm removably mounted to a body of the camera by a screw extending through an opening in the arm into a threaded aperture on the body of the camera;
    (b) a housing mounted to the arm, the housing having a circular cylindrical sidewall and a central passage for receiving a hand-grippable handle of an umbrella; and wherein the hand-grippable handle of the umbrella is removably mounted in the housing.

2. The apparatus in accordance with claim 1, wherein the arm further comprises a finger mounted to the housing at an end of the arm.

3. The apparatus in accordance with claim 2, wherein the housing is rigidly mounted to the finger, and the housing has a circular cylindrical sidewall and a central passage receiving the hand-grippable handle of the umbrella.

4. The apparatus in accordance with claim 1, wherein the umbrella is opened and an outer extremity of the umbrella extends beyond edges of the camera.

5. The apparatus in accordance with claim 1, wherein the arm has a threaded aperture adjacent to the opening for inserting a screw of a tripod.

* * * * *